United States Patent
Dobrowolski et al.

(10) Patent No.: US 11,711,509 B2
(45) Date of Patent: Jul. 25, 2023

(54) EARLY VIDEO EQUIPMENT FAILURE DETECTION SYSTEM

(71) Applicant: Carrier Corporation, Palm Beach Gardens, FL (US)

(72) Inventors: Jaroslaw Dobrowolski, Gdansk (PL); Sylwester Mroz, Pomerania (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 646 days.

(21) Appl. No.: 16/808,741

(22) Filed: Mar. 4, 2020

(65) Prior Publication Data

US 2020/0288118 A1     Sep. 10, 2020

Related U.S. Application Data

(60) Provisional application No. 62/813,890, filed on Mar. 5, 2019.

(51) Int. Cl.
*H04N 17/00* (2006.01)
*G08B 21/18* (2006.01)
*H04N 23/90* (2023.01)
*H04N 23/661* (2023.01)

(52) U.S. Cl.
CPC ......... *H04N 17/002* (2013.01); *G08B 21/187* (2013.01); *H04N 23/661* (2023.01); *H04N 23/90* (2023.01)

(58) Field of Classification Search
None
See application file for complete search history.

(56) References Cited

U.S. PATENT DOCUMENTS

| | | | | |
|---|---|---|---|---|
| 4,039,960 A * | 8/1977 | Clark | ..................... | H03K 5/135 327/144 |
| 6,166,763 A * | 12/2000 | Rhodes | .................. | H04N 7/181 348/E7.086 |
| 2005/0257041 A1 * | 11/2005 | Wallenstein | .......... | G06F 21/305 713/2 |

(Continued)

FOREIGN PATENT DOCUMENTS

EP     2229001 A1     9/2010

OTHER PUBLICATIONS

European Search Report for U.S. Appl. No. 20159782.0 filed on Feb. 27, 2020; dated Jun. 17, 2020; 8 pages.

*Primary Examiner* — John W Miller
*Assistant Examiner* — Omer Khalid
(74) *Attorney, Agent, or Firm* — Cantor Colburn LLP

(57) ABSTRACT

A video camera system including: one or more video cameras; a video recorder in communication with each of the one or more video cameras; a video analytics module, the video analytics module being a computer program product embodied on a computer readable medium, the computer program product including instructions that, when executed by a processor, cause the processor to perform operations including: obtaining video parameters of a plurality of video frames received at the video recorder, the plurality of video frames being transmitted from the one or more video cameras to the video recorder; determining an abnormality within the video parameters; and identifying a malfunctioning video camera of the one or more video cameras that produced the abnormality within the video parameters.

7 Claims, 2 Drawing Sheets

(56) References Cited

U.S. PATENT DOCUMENTS

Figure 1:
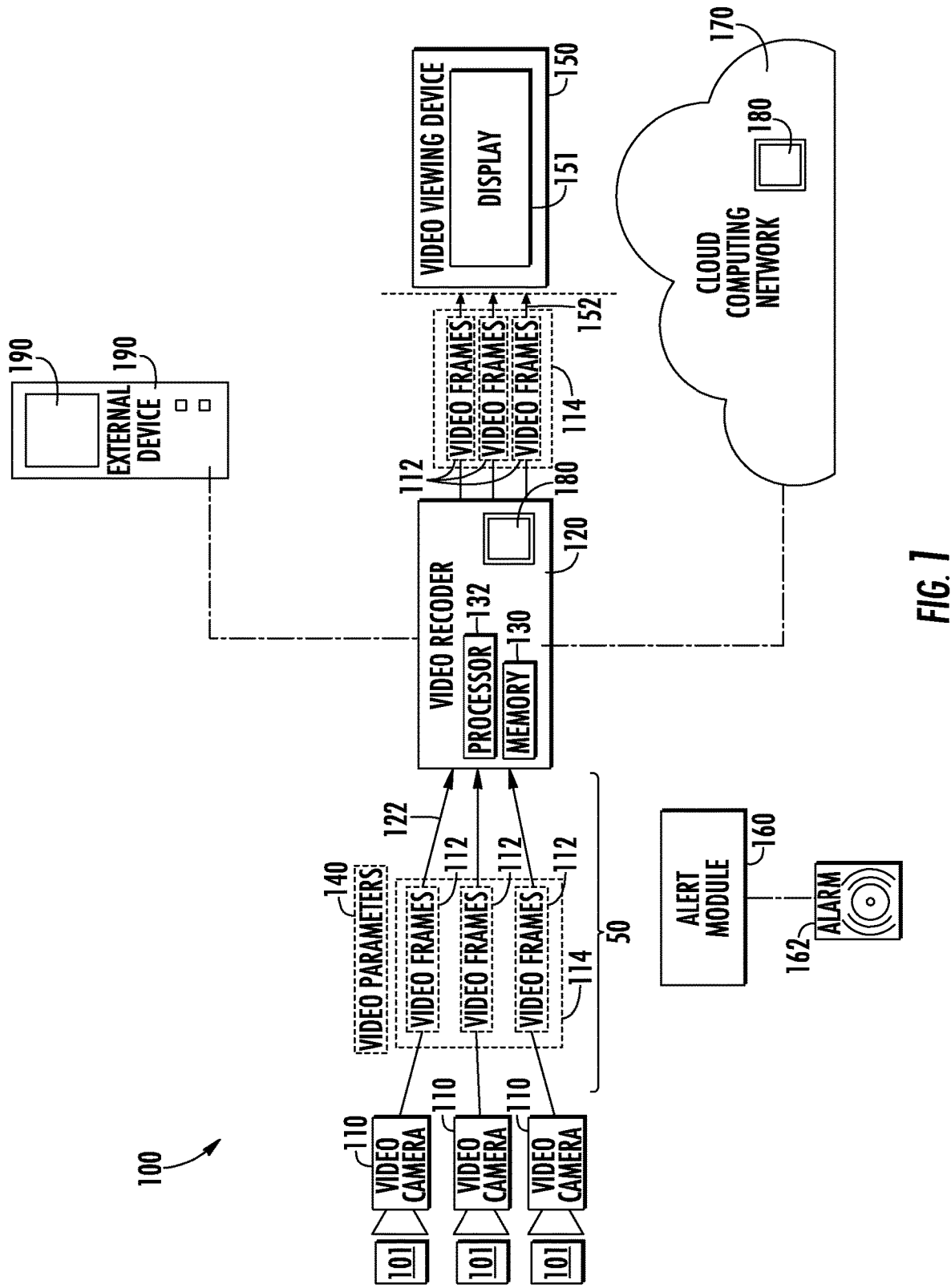

| | | | |
|---|---|---|---|
| 2007/0039030 A1 | 2/2007 | Romanowich et al. | |
| 2008/0005626 A1* | 1/2008 | Schaff | G06F 1/3203 |
| | | | 714/48 |
| 2008/0049104 A1* | 2/2008 | Chang | H04N 5/77 |
| | | | 348/143 |
| 2009/0064248 A1* | 3/2009 | Kwan | H04L 49/555 |
| | | | 725/109 |
| 2010/0033586 A1* | 2/2010 | Kim | G08B 13/19645 |
| | | | 348/211.6 |
| 2012/0201310 A1* | 8/2012 | Yamagishi | G06T 7/0002 |
| | | | 375/240.27 |
| 2012/0257045 A1* | 10/2012 | Ockerse | H04N 7/181 |
| | | | 348/135 |
| 2013/0002864 A1* | 1/2013 | Lundberg | H04N 23/661 |
| | | | 348/143 |
| 2013/0235214 A1 | 9/2013 | Gu | |
| 2015/0085115 A1 | 3/2015 | Sternberg et al. | |
| 2015/0097971 A1* | 4/2015 | Gao | H04N 21/2402 |
| | | | 348/192 |
| 2016/0353023 A1* | 12/2016 | Lee | H04N 5/23206 |
| 2016/0372157 A1 | 12/2016 | Funagi | |
| 2018/0131857 A1 | 5/2018 | Uchida | |
| 2019/0200013 A1* | 6/2019 | Wu | H04N 19/115 |
| 2019/0354769 A1* | 11/2019 | Lehn | G08G 1/096775 |

* cited by examiner

EARLY VIDEO EQUIPMENT FAILURE DETECTION SYSTEM

CROSS-REFERENCE TO RELATED APPLICATIONS

This application claims the benefit of Provisional Application No. 62/813,890 filed Mar. 5, 2019, the disclosure of which is incorporated herein by reference in its entirety.

BACKGROUND

The subject matter disclosed herein generally relates to the field of video networks, and more particularly to an apparatus and method for evaluating and diagnosing video camera.

When a video camera breaks down there is no video stream footage, which leads to a lack of recorded video on the recorder. It is often difficult to predict the camera failure and a camera owner can typically react only after a failure occurs.

BRIEF SUMMARY

According to one embodiment, a video camera system is provided. The video camera system including: one or more video cameras; a video recorder in communication with each of the one or more video cameras; a video analytics module, the video analytics module being a computer program product embodied on a computer readable medium, the computer program product including instructions that, when executed by a processor, cause the processor to perform operations including: obtaining video parameters of a plurality of video frames received at the video recorder, the plurality of video frames being transmitted from the one or more video cameras to the video recorder; determining an abnormality within the video parameters; and identifying a malfunctioning video camera of the one or more video cameras that produced the abnormality within the video parameters.

In addition to one or more of the features described above, or as an alternative, further embodiments may include that the computer readable medium is located within the video recorder.

In addition to one or more of the features described above, or as an alternative, further embodiments may include an external device in communication with the video recorder, wherein the computer readable medium is located within the external device.

In addition to one or more of the features described above, or as an alternative, further embodiments may include: a cloud computing network in communication with the video recorder, wherein the computer readable medium is located within the cloud computing network.

In addition to one or more of the features described above, or as an alternative, further embodiments may include that the operations further include: deactivating the malfunctioning video camera.

In addition to one or more of the features described above, or as an alternative, further embodiments may include that the operations further include: activating a video camera of the one or more video cameras to capture video frames of an area previously being captured by the malfunctioning video camera.

In addition to one or more of the features described above, or as an alternative, further embodiments may include that the operations further include: adjusting a video camera of the one or more video cameras to capture video frames of an area previously being captured by the malfunctioning video camera.

In addition to one or more of the features described above, or as an alternative, further embodiments may include that the operations further include: activating an alarm in response to the malfunctioning video camera.

In addition to one or more of the features described above, or as an alternative, further embodiments may include that the video parameters include a video frame lost ratio, wherein the abnormality is the video frame lost ratio being greater than a selected value.

In addition to one or more of the features described above, or as an alternative, further embodiments may include that the video parameters include a video frame rate, wherein the abnormality is the video frame rate being outside a selected range.

In addition to one or more of the features described above, or as an alternative, further embodiments may include that the video frames are organized into video packets.

In addition to one or more of the features described above, or as an alternative, further embodiments may include that the video parameters include a video packet lost ratio, wherein the abnormality is the video packet lost ratio being greater than a selected value.

In addition to one or more of the features described above, or as an alternative, further embodiments may include that the video parameters include a video packet rate, wherein the abnormality is the video packet rate being outside a selected range.

According to another embodiment, a method of operating a video camera system is provided. The method including: obtaining video parameters of a plurality of video frames received at a video recorder, the plurality of video frames being transmitted from one or more video cameras to the video recorder; determining an abnormality within the video parameters; and identifying a malfunctioning video camera of the one or more video cameras that produced the abnormality within the video parameters In addition to one or more of the features described above, or as an alternative, further embodiments may include deactivating the malfunctioning video camera.

In addition to one or more of the features described above, or as an alternative, further embodiments may include activating a video camera of the one or more video cameras to capture video frames of an area previously being captured by the malfunctioning video camera.

In addition to one or more of the features described above, or as an alternative, further embodiments may include adjusting a video camera of the one or more video cameras to capture video frames of an area previously being captured by the malfunctioning video camera.

In addition to one or more of the features described above, or as an alternative, further embodiments may include activating an alarm in response to the malfunctioning video camera.

In addition to one or more of the features described above, or as an alternative, further embodiments may include that the video parameters include at least a video frame lost ratio, wherein the abnormality is the video frame lost ratio being greater than a selected value.

In addition to one or more of the features described above, or as an alternative, further embodiments may include that the video parameters include a video frame rate, wherein the abnormality is the video frame rate being outside a selected range.

Technical effects of embodiments of the present disclosure include analyzing video metadata captured from one or more video cameras and determining abnormalities using video analytics module installed on a video recorder, an external device, or a cloud computing network.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
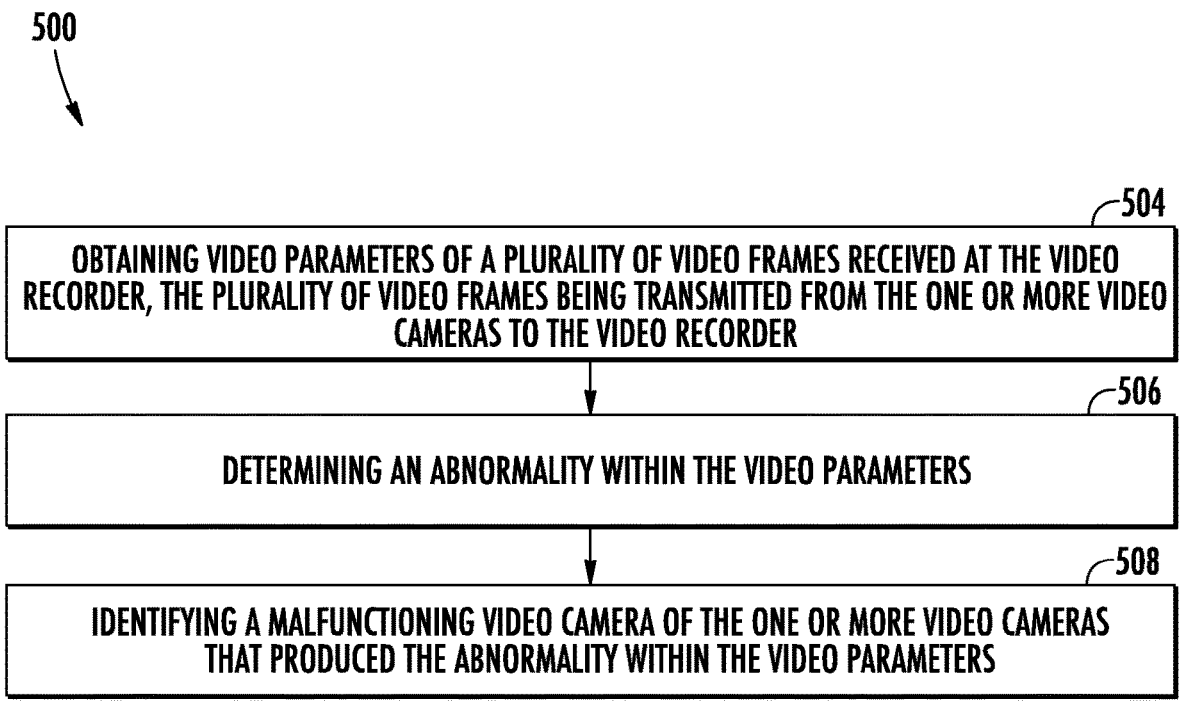

The following descriptions should not be considered limiting in any way. With reference to the accompanying drawings, like elements are numbered alike:

FIG. 1 illustrates a general schematic system diagram of a video recording system, in accordance with an embodiment of the disclosure; and FIG. 2 is a flow diagram illustrating a method of operating the video recording system of FIG. 1, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 schematically illustrates a video recording system 100, in accordance with an embodiment of the present disclosure. It should be appreciated that, although particular systems are separately defined in the schematic block diagrams, each or any of the systems may be otherwise combined or separated via hardware and/or software. The video recording system 100 may include one or more video cameras 110 and a video recorder 120 in communication with each of the one or more video cameras 110. Each video camera 110 may be positioned to capture video frames 112 of an area 101. The areas 101 of each camera 110 may overlap with areas of other cameras 110 either partially or in full. Thus, if once camera 110 were to fail another camera 110 may be activated to capture video frames 112 of the area 101 where the video camera 110 failed. Each video camera 110 may be adjustable to be repositioned to capture the same area 101 or multiple areas 101.

The video recording system 100 may optionally include an external device 190 or a cloud computing network 170, although neither is required unless a video analytics module 180 is installed thereon. The video recorder 120 may be in communication with the external device 190 and/or the cloud computing network 170. The external device 190 may be a computing device capable of doing real-time analysis, such as, for example, a desktop computer, a laptop computing, a tablet computer, a smart phone, a smart watch, or similar computing device known to one of skill in the art. Although not shown for simplification, the external device 190 may include a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The external device 190 may be a part of video system in the same local network.

The cloud computing network 170 may be a remote device(s) that is outside the local network. The cloud architecture is transparent to the video system and can be scalable, such that the video analytics module 180 can be installed on multiple devices in the cloud computing network 170. The remote device(s) of the cloud computing network 170 may be a computing device capable of doing real-time analysis, such as, for example, a desktop computer, a laptop computing, a tablet computer, a smart phone, a smart watch, or similar computing device known to one of skill in the art. Although not shown for simplification, the remote device(s) of the cloud computing network 170 may include a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

A video analytics module 180 is installed on the video recorder 120, the external device 190, or the cloud computing network 170. The video cameras 110 capture video frames 112 and transmits the video frames 112 to the video recorder 120. The video frames 112 from one or more video cameras 110 arrive at the video recorder 120 as an incoming stream 122. The video frames 112 may be organized into packets 114 by the video camera 110. The video packets 114 contain information such as, for example, an IP address from where the video packets 114 are coming from, an IP address where to send the video packets 114, a type of the video frame 112, a number of video frames 112, time stamps of each video frame 112 and video parameters 140 discussed further herein. The video packets 114 may be transmitted from the video recorder 120 to a video viewing device 150. The video viewing device 150 may be a computing device, such as, for example a desktop computer, laptop computer, smart phone, smart watch, or similar device known to one of skill in the art. The video packets 114 are received at the video viewing device 150 as an incoming stream 152 and the video viewing device 150 may contains a decoder (not shown) configured to receive the video packets 114 and collapse the video packets 114 into video frames 112 to be sent to a display 151, which then displays the video frames 112 received.

A video analytics module 180 may be installed within the video recording system 100. The video analytics module 180 may be installed directly on the video recorder 120, the external device 190, or the cloud computing network 170. In an embodiment, the video analytics module 180 is installed directly on the video recorder 120. In another embodiment, the video analytics module 180 is installed on the external device 190, which is in communication with the video recorder 120. In another embodiment, the video analytics module 180 is installed on the cloud computing network 170, which is in communication with the video recorder 120.

The video analytics module 180 may be a software algorithm configured to collect and analyze video frames 112 received at the video recorder 120 from the video cameras 110. Additionally, the video analytics module 180 may be self-learning and may use neural networks or deep learning. For example, detected abnormalities may be a result of typical camera operation and environment changes therefore further self-learning analysis may be needed. The video analytics module 180 is configured to collect and analyze video parameters 140 of the video frames 112 and/or video packets 114. The video parameters 140 are statistical information regarding the video frames 112 and/or the video packets 114. The video parameters 140 may include but are not limited to time between video frames 112, time between video packets 114, a sequential number of a video frame 112, and a sequential number of a video packet 114, a group of pictures (GOP) structure, a size of the video packet 114 and a real frame per second (FPS) value. The size of the video packet 114 may be used to calculate frame size and bandwidth The video frames 112 and/or video packets 114 are collected in the incoming stream 122 of the video recorder 120 and stored in a memory 130 of the video recorder 120. The video analytics module 180 collects the video parameters 140 of the video frames 112 and/or video packets 114 in the incoming stream 122 of the video recorder 120 along a path 50 from the video camera 110. The path 50 between the video cameras 110 and the video recorder may be hardwired and/or wireless. The collection of the video parameters 140 allows for a quantitative analysis of the video parameters 140 to detect abnormalities in the video parameters 140 with one of the video cameras 110, such as, for example, a delay between GOPs, a delay video frames 112, lost video packets 114, delays in video packet 114 delivery, irregularity in video frame 112 bandwidth, and irregularity in video frame 112 delivery.

If an abnormality is detected in the video parameters 140 then the video analytics module 180 may activate an alarm 162 on an alert module 160. The alarm 162 may be audible, visual, and/or vibratory. The alert module 160 may be separate standalone computing devices, such as, for example, a desktop computer, a laptop computing, a tablet computer, a smart phone, a smart watch, or similar computing device known to one of skill in the art. Alternatively, the alert module 160 maybe be a computer program product (e.g., software application) installed on at least one of a computing device (not shown), the video recorder 120, the external device 190, and the cloud computing network 170. Additionally, if an abnormality is detected in the video parameters 140 of a particular video camera 110 then the video camera 110 may be considered to be malfunctioning and the video analytics module 180 may automatically direct another video camera 100 to capture video frames 112 of the area 101 that was previously captured by the video camera 110 determined to be malfunctioning. This direction by the video analytics module 180 may involve deactivating the video camera 110 determined to be malfunctioning and/or activating another video camera 110 to capture video frames 112 of the area 101 that was previously captured by the video camera 110 determined to be malfunctioning. This direction by the video analytics module 180 may involve adjusting (e.g., repositioning, moving, rotating, aiming, angling, focusing, zooming in, zooming out) another video camera 110 to capture video frames 112 of the area 101 that was previously captured by the video camera 110 determined to be malfunctioning.

The video parameters 140, the video frames 112 and/or video packets 114 may be collected and stored on a memory 130 within the video recorder 120. The memory 130 may be a storage device such as, for example, a random access memory (RAM), read only memory (ROM), or other electronic, optical, magnetic or any other computer readable medium. The video recorder 120 may include a processor 132 capable of writing to the memory 130. The processor 132 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously.

Although not shown for simplicity the external device 190 and the cloud computing network 170 may also include a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The video analytics module 180 is configured to analyze the video parameters of the video packets 114 and video frames 112 contained in the memory 130. The video analytics module 180 is configured to determine a video packet lost ratio and a video frame lost ratio in response to the video parameters 140 of the video frames 112 and video packets 114. The video packet lost ratio may be determined by analyzing the sequential numbers of each video packet 114 and determining if a sequential number of a video packet 114 is missing in the sequence. The video packet lost ratio may also be calculated in a real-time transport protocol (RTP) stream situation. In an RTP stream situation, the video packets 114 are numbered and that information is stored in the RTP header (application layer in the video packet layer). Each next video packet 114 has a sequence number about one bigger than a predecessor video packet 114, thus a value of how many video packets 114 should be received by the video recorder 120 and how many video packets 114 were lost may be determined.

The video frame lost ratio may be determined by analyzing the sequential numbers of each video frame 112 and determining if a sequential number of a video frame 112 is missing in the sequence. The video frame lost ratio may be determined by analyzing the sequential numbers of each video frame 112 and determining if a sequential number of a video frame 112 is missing in the sequence. The video frame lost ratio may also be calculated in a real-time transport protocol (RTP) stream situation. In an RTP stream situation, the video frames 112 are numbered and that information is stored in the RTP header (application layer in the video frame layer). Each next video frame 112 has a sequence number about one bigger than a predecessor video frame 112, thus a value of how many video frames 112 should be received by the video recorder 120 and how many video frames 112 were lost may be determined.

Advantageously by determining a video packet lost ratio and a video frame lost ratio, a statistical description of the quality of each of the video cameras 110 is provided while considering that one video packet lost for the Intra-frame may cause the whole set of frames (e.g. the whole GOP) to be impossible to decode. A video packet lost ratio or a video frame lost ratio greater than a selected value may indicate that an abnormality in the video parameters 140 that is caused by a video camera 110 that is malfunctioning.

The video analytics module 180 is also configured to determine an abnormality in the video packet rate of the video packets 114 and an abnormality in the frame rate of in video frames 112 in response to the video parameters 140 of the video frames 112 and video packets 114. An abnormality in the video packet rate may be that the video packet rate is outside of a selected range (e.g., either faster or slower than the selected range). An abnormality in the video frame rate may be that the video packet frame is outside of a selected range (e.g., either faster or slower than the selected range). For example, an abnormality in the video packet rate of the video packets 114 may be a delay amongst the video packets 114 and an abnormality in the frame rate of the video frames 112 may be a delay amongst the video frames 112.

The delay in video frames 112 may be determined by analyzing the sequential time stamps of each video frame 112 and determining if a there is a delay between the sequential time stamps of each video frame 112 in the sequence. For instance, the video frames 112 may be captured at a set frequency, thus the time between the sequential time stamp of each video frame 112 should be about equivalent. If the time between each video frames 112 begins to vary or become intermittent than it may be indicative of an abnormality in the video parameters 140 caused by a video camera 110 that is malfunctioning.

The delay in video packets 114 may be determined by analyzing the sequential time stamps of each video packets 114 and determining if a there is a delay between the sequential time stamps of each video packet 114 in the sequence. For instance, the video packets 114 may be organized at a set frequency, thus the time between the sequential time stamp of each video packet 114 should be about equivalent. If the time between each video packet 114 begins to vary or become intermittent than it may be indicative of an abnormality in the video parameters 140 caused by a video camera 110 that is malfunctioning.

The video analytics module 180 is also configured to measure and analyze other real video channel parameters of the video cameras 110 including but not limited to a real frame per second (FPS) value and a real GOP value, which is a count of the frames between two I-frames including a first count tacking which I-frames sent by a video recorder 120 are real. Sometimes when a video cameras 110 are subjected to high stress (e.g., when the camera looks at a static scene but that scene is dramatically changed) the camera can start transmitting a new I-Frame to produce a better video quality instead of the rest of the P-Frames and in this scenario the real GOP is lower than configured on the camera. In a high stress scenario, sometimes I-frames are changed to P-frames because the camera is trying not exceed the bandwidth and in this scenario the real GOP may be higher than configured on the video camera 110.

Additionally, the video analytics module 180 is also configured to measure, analyze, and determine a statistical description of a variety of time parameters including: a time taken for sending one particular video frame; a time taken for sending all frames in one GOP; and a time between the last video packet of the predecessor frame and the last video packet of the successor frame.

During the analysis, the video analytics module 180 is configured to measure effective bandwidth and instantaneous bandwidth, while considering asynchronous interference of dozens and hundreds of video streams as an average value for a configurable time window such as, for example, 1 ms, 5 ms, 10 ms, 330 ms (~equivalent of 1GOP encoder) 1 s. The video analytics module 180 is also configured to visualize the effective bandwidth and instantaneous bandwidth. The effective bandwidth is calculated for the video packets 114. It is calculated by factor of how much data was received in the specific time window. The instantaneous bandwidth is calculated by a factor of a size of video frame 112 divided by time of how long that frame 112 was received.

Additionally, during the analysis, the video analytics module 180 is configured to measure the "time dispersion between video frames 112" to check if the video is smooth to determine if the video camera 110 is malfunctioning. The video analytics module 180 is also configured to measure a size of the video frames 112 and statistical description of differences between I and P-frames of the video packets 114 for the given encoder parameters and the dynamism of the scene in front of the video camera 110. The video analytics module 180 is also configured to visualize the size of the video frames 112 and statistical description of differences between I and P-frames of the video packets 114

Referring now to FIG. 2, with continued reference to FIG. 1, a flow chart of method 500 of operating a video recording system 100 is illustrated, in accordance with an embodiment of the present disclosure. In an embodiment, the method 500 is performed by the video analytics module 180. The video analytics module 180 may be a computer program product embodied on a computer readable medium. The video analytics module 180 (i.e., computer program product) may include instructions that, when executed by a processor, cause the processor to perform operations comprising method 500. In one embodiment, the computer readable medium where the video analytics module 180 is stored may be located within the video recorder 120. In another embodiment, the computer readable medium where the video analytics module 180 is stored may be located within the external device 190. In another embodiment, the computer readable medium where the video analytics module 180 is stored may be located within the cloud computing network 170.

At block 504, video parameters 140 of a plurality of video frames 112 received at the video recorder 120 are obtained. The plurality of video frames 112 are transmitted from the one or more video cameras 110 to the video recorder 120.

At block 506, an abnormality is determined within the video parameters 140. In one embodiment, the video parameters 140 include at least a video frame lost ratio and an abnormality may be determined if the video frame lost ratio is greater than a selected value. It is understood that one or more of the video parameters 140 may be used to determine an abnormality and the video frame lost ratio may be one of many video parameters 140 taken into consideration. In another embodiment, the video parameters 140 include a video frame rate and an abnormality may be determined if the video frame rate is outside a selected range.

The video frames 112 may be organized into video packets 114, as discussed herein. In an embodiment, the video parameters 140 include a video packet lost ratio and an abnormality may be determined if the video packet lost ratio is greater than a selected value. In an embodiment, the video parameters 140 include a video packet rate and an abnormality may be determined if the video packet rate is outside a selected range.

At block 508, a malfunctioning video camera 110 of the one or more video cameras 110 that produced the abnormality within the video parameters 140 is identified.

The method 500 may include deactivating the malfunctioning video camera 110. The method 500 may also include activating a video camera 110 of the one or more video cameras 110 to capture video frames 112 of an area 101 previously being captured by the malfunctioning video camera 110. The method 500 may further include adjusting a video camera 110 of the one or more video cameras 110 to capture video frames 112 of an area 101 previously being captured by the malfunctioning video camera 110. Additionally, an alarm 162 may be activated in response to the malfunctioning video camera 110.

While the above description has described the flow processes of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A video camera system comprising:
   one or more video cameras;
   a video recorder in communication with each of the one or more video cameras;
   a video analytics module, the video analytics module being a computer program product embodied on a computer readable medium, the computer program product including instructions that, when executed by a processor, cause the processor to perform operations comprising:
   obtaining video parameters of a plurality of video frames received at the video recorder, the plurality of video frames being transmitted from the one or more video cameras to the video recorder;
   determining an abnormality within the video parameters; and
   identifying a malfunctioning video camera of the one or more video cameras that produced the abnormality within the video parameters,
   wherein the video parameters include:
      a video frame lost ratio and the abnormality is the video frame lost ratio being greater than a selected value;
      a video frame rate and the abnormality is the video frame rate being outside a selected range;
      a video packet lost ratio and the abnormality is the video packet lost ratio being greater than a selected value; or
      a video packet rate and the abnormality is the video packet rate being outside a selected range.

2. The video camera system of claim 1, wherein the operations further comprise:
   deactivating the malfunctioning video camera.

3. The video camera system of claim 1, wherein the operations further comprise:
   activating an alarm in response to the malfunctioning video camera.

4. The video camera system of claim 1 wherein:
   in response to identifying the malfunctioning video camera, activating or adjusting a video camera of the one or more video cameras to capture video frames of an area previously being captured by the malfunctioning video camera.

5. The video camera system of claim 1, wherein the computer readable medium is located within the video recorder.

6. The video camera system of claim 1, further comprising:
   an external device in communication with the video recorder, wherein the computer readable medium is located within the external device.

7. The video camera system of claim 1, further comprising:
   a cloud computing network in communication with the video recorder, wherein the computer readable medium is located within the cloud computing network.

* * * * *